United States Patent [19]
Kane et al.

[11] Patent Number: 5,420,878
[45] Date of Patent: May 30, 1995

[54] PRODUCTION OF LASER LIGHT WITH CONTROLLABLE ATMOSPHERIC ABSORPTION

[75] Inventors: Thomas J. Kane, Menlo Park; Tracy S. Kubo, Sunnyvale, both of Calif.

[73] Assignee: Lightwave Electronics Corporation, Mountain View, Calif.

[21] Appl. No.: 80,068

[22] Filed: Jun. 18, 1993

[51] Int. Cl.$^6$ .................................................. H01S 3/16
[52] U.S. Cl. .......................................... 372/41; 372/21; 372/40; 372/70; 372/94; 359/328
[58] Field of Search .................. 372/41, 40, 39, 69, 372/70, 73, 94, 21, 22; 385/142; 359/328

[56] References Cited

U.S. PATENT DOCUMENTS

| | | | |
|---|---|---|---|
| 4,578,793 | 3/1986 | Kane et al. | 372/94 |
| 4,807,241 | 2/1989 | Berkstresser et al. | 372/40 X |
| 5,030,851 | 7/1991 | Unternahrer | 372/22 X |
| 5,175,787 | 12/1992 | Gualtieri et al. | 385/141 X |
| 5,280,492 | 1/1994 | Krupke et al. | 372/41 |

*Primary Examiner*—Rodney B. Bovernick
*Assistant Examiner*—Hemang Sanghavi
*Attorney, Agent, or Firm*—John F. Schipper

[57] ABSTRACT

A laser material for a solid-state laser that, when pumped by light having a wavelength in a suitable pump band, emits electromagnetic radiation having a wavelength lying in the range $2.0 \leq \lambda \leq 2.1$ μm. The laser host material includes thulium-doped lutetium yttrium aluminum garnet (Tm:LuYAG) of approximate chemical composition $(Tm_x(Y_wLu_{1-w})_{1-x})_3Al_5O_{12}$, with x lying approximately in the range $0.01 \leq x \leq 0.5$ and w lying in the range between 0.01 and 0.99. In particular, the Tm:LuYAG material produces light with wavelengths in the range $\lambda = 2.020$–$2.024$ μm, where the normally-absorbing atmosphere has a transmission window with markedly reduced (or, alternatively, markedly enhanced) absorption. Another suitable group of laser materials has the chemical composition $(Tm_x(Y_wLu_{1-w-z}Sen_z)_{1-x})_3Al_5O_{12}$, with x lying approximately in the range $0.01 \leq x \leq 0.5$, w lying in the range $0.01 \leq w \leq 0.99$ and z lying in the range $0.001 \leq z \leq 0.2$, and Sen denotes an optical sensitizer such as Er, Yb and/or Cr. Other suitable laser materials, for production of light with wavelengths in the range 1.9–2.2 μm, are thulium-doped yttrium lithium fluoride and lithium-doped yttrium scandium aluminum garnet, with the respective approximate chemical compositions $Tm_x(Y_wLu_{1-w})_{1-x}LiF_4$, and $(Tm_x(Y_wLu_{1-w})_{1-x})_3Sc_2Al_3O_{12}$, with x lying approximately in the range $0.01 \leq x \leq 0.5$ and w lying in the range between 0.01 and 0.99. If the Tm doping fraction and the Lu fraction in Tm:LuYAG are no greater than 0.03 and 0.5, respectively, the material Tm:LuYAG exhibits useful ranges of monotonically changing emission wavelength as temperature is varied over a reasonable range.

11 Claims, 4 Drawing Sheets

PRODUCTION OF LASER LIGHT WITH CONTROLLABLE ATMOSPHERIC ABSORPTION

FIELD OF THE INVENTION

Work on this invention was partly funded under U.S. Air Force Contract F19628-90-C-0111. The U.S. government has certain rights in this invention. This invention relates to laser materials for production of light in particular wavelength ranges, and more particularly to production of light with relatively low or relatively high absorption in the atmosphere.

BACKGROUND OF THE INVENTION

The crystalline material known as YAG (yttrium aluminum garnet, with the chemical formula $Y_3Al_5O_{12}$) is well known as a solid-state laser host material. When a fraction of Y atoms in YAG, generally between one and ten percent, is replaced by thulium atoms (Tm), this material, Tm:YAG, can be used to make lasers that oscillate near an optical wavelength $\lambda = 2$ microns ($\mu m$). When tuning means, such as etalons or prisms, are placed in a laser resonator containing the Tm:YAG material, the laser output signals can be tuned over a limited range around 2 $\mu m$. However, inclusion of tuning means in a laser resonator is undesirable, because this reduces the efficiency and increases the complexity of the resulting laser.

One attractive application of lasers that operate near $\lambda = 2$ $\mu m$ is for remote sensing of wind velocity and other weather parameters. This application requires use of a wavelength for which the atmosphere is highly transparent or tuning to a well-defined wavelength on or off a local maximum or local minimum for light absorption. FIGS. 1 and 2 illustrate an atmospheric absorption parameter $\alpha$ ($km^{-1}$) for a cumulative wavelength range 2.010 $\mu m \leq \lambda \leq 2.030$ $\mu m$, showing some fine structure in this parameter for variable wavelength. From this Figure it is evident that monochromatic light with certain wavelengths is at least 50 percent attenuated within 100 meters, and that monochromatic light at other wavelengths may be only 50 percent attenuated after propagation for 10 km or more through the atmosphere. Preferably, although not necessarily, laser energy of at least 25 millijoules (mJ) should be used to propagate a distance such as 10 kilometers (km) or more through a stable atmosphere and to provide a usable return signal from aerosol scatter. Propagation of such a signal may require laser energy as high as 1-10 Joules, if the signal source is a satellite orbiting at a height of about 300 km.

Most wind-sensing laser systems used thus far have relied upon a $CO_2$ laser ($\lambda = 10.6$ $\mu m$) or, less often on a Nd:YAG laser ($\lambda = 1.06$ $\mu m$). Radiation from a $CO_2$ laser often, falls in an absorption band for atmospheric water vapor or for $CO_2$ and thus has a relatively small transmission coefficient at such wavelengths. Further disadvantages of a $CO_2$ laser are: (1) the size of a $CO_2$ laser required to produce a given output energy is much larger than a corresponding solid-state laser; (2) a $CO_2$ laser often require high drive voltages, of the order of 1000 volts, as compared with a drive voltage of about 10 volts required for a solid-state laser; and (3) a $CO_2$ laser will often wear out quicker or require more frequent maintenance than a solid-state laser.

Use of conventional Nd:YAG laser radiation in an open environment is problematical, because light of this wavelength presents a serious hazard to the eye. S. W. Henderson recently demonstrated a coherent laser radar system using a Cr:Tm:Ho:YAG solid-state laser to produce 2.09 $\mu m$ radiation ("Coherent solid-state 1.06 and 2.1 $\mu m$ lidar system for wind velocity measurements"; invited lecture EO4.2, given at LEOS annual meeting, November 1990, Boston, Mass.). Another interesting laser material, Tm:YAG, has been shown to produce laser radiation at wavelength 2.02 $\mu m$ with up to 1 mJ output energy (T. J. Kane and T. S. Kubo, "Diode-pumped injection-seeded Q-switched Tm:YAG laser", invited lecture, SSL1.3, 1990 LEOS annual meeting; and P. J. M. Suni and S. W. Henderson, "Diode-pumped 2 $\mu m$ lasers for the mJ/pulse regime and beyond", invited lecture SSL1.1, 1990 LEOS annual meeting).

What is needed is a laser (1) whose emission wavelength is selectable across a range of wavelengths, including a wavelength interval such as 2.010- 2.030 $\mu m$, where light is strongly transmitted in the atmosphere; (2) that is both simple to fabricate and relatively efficient in operation; (3) whose output can be scaled over an output energy range that includes 1-1,000 millijoules; and (4) that can oscillate at a single frequency without use of an intra-cavity wavelength selection device.

SUMMARY OF THE INVENTION

These needs are met by the invention, which provides a material composition that may be varied to produce a controllable range of wavelengths $\lambda = 2.010$–$2.030$ $\mu m$, with extensions to higher or lower wavelength ranges 1.8-2.2 $\mu m$ if desired. In a first embodiment, the (solid-state) laser material is thulium-doped lutetium yttrium aluminum garnet (Tm:LuYAG) of approximate chemical composition $(Tm_x(Y_wLu_{1-w})_{1-x})_3Al_5O_{12}$, with x and w lying in the ranges $0.01 < x \leq 0.50$ and $0.01 \leq w \leq 0.99$. Another suitable laser material is $(Tm_x(Y_wLu_{1-w-z}Sen_z)_{1-x})_3Al_5O_{12}$, where Sen denotes an optical sensitizer, such as Er, Yb or Cr, and z lies in the range $0.001 \leq z \leq 0.2$. Other suitable laser materials include $Tm_x(Y_wLu_{1-w})_{1-x}LiF_4$ and $(Tm_x(Y_wLu_{1-w})_{1-x})_3Sc_2Al_3O_{12}$. The emission wavelength of a laser fabricated with such a material appears to increase monotonically with temperature over temperature sub-ranges within the range $-15°$ C. to $+50°$ C., if the Tm doping fraction is $x \leq 0.03$ and the fraction of Lu present is $\leq$ than 0.5.

DESCRIPTION OF BEST MODE OF THE INVENTION

Figure 1:
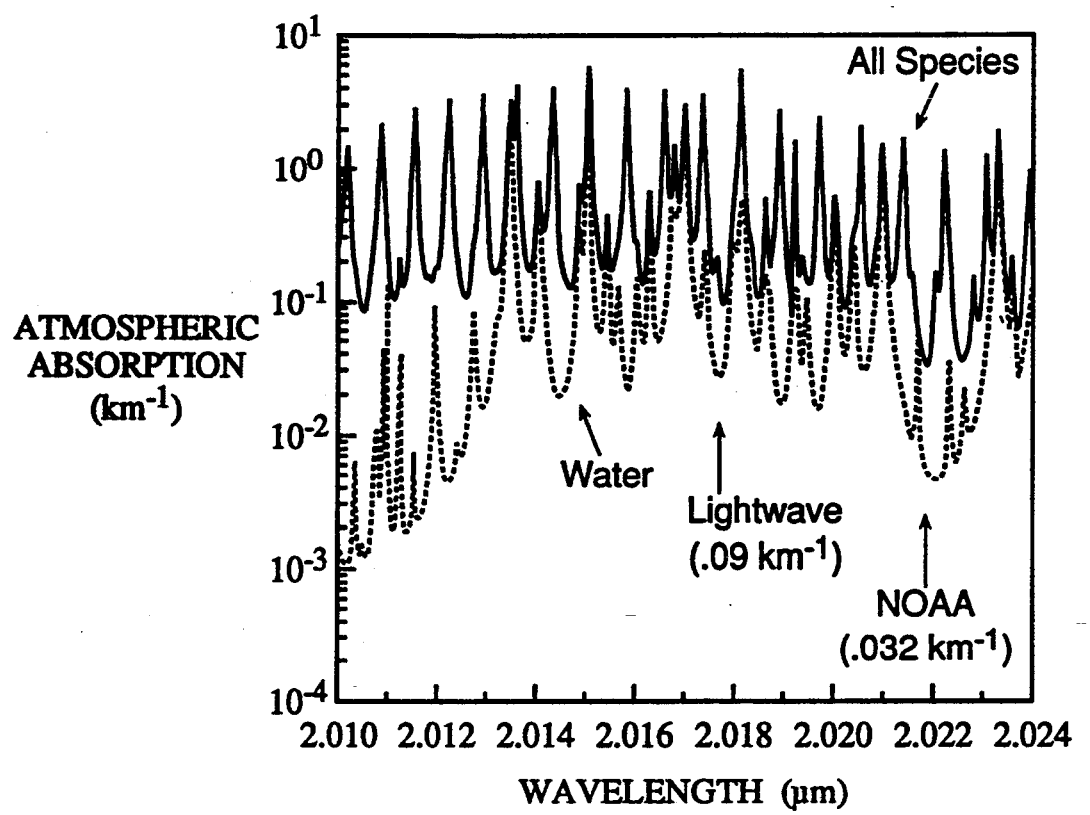
FIGS. 1 and 2 are graphical views of absorption of monochromatic light propagated in the atmosphere versus the wavelength $\lambda$ of that light over a cumulative wavelength range 2.010 $\mu m \leq \lambda \leq 2.030$ $\mu m$.
Figure 2:
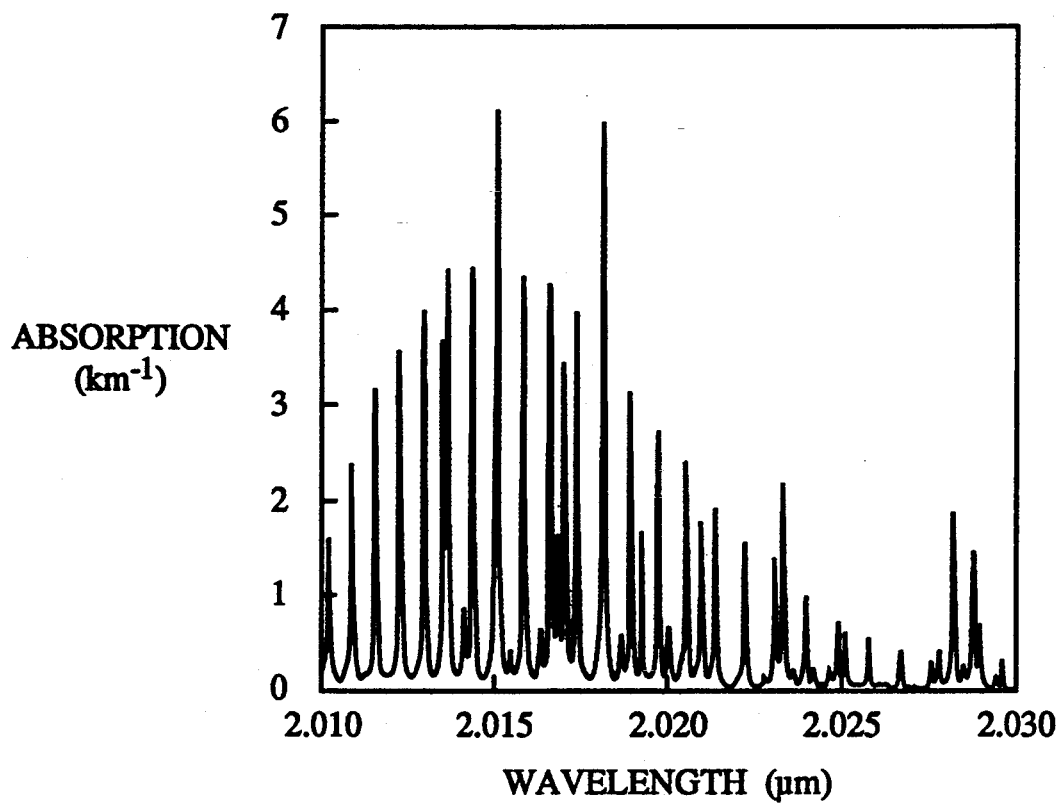

The invention provides a laser with a selectable output wavelength suitable for sensing the presence and velocity of wind in the atmosphere, for distances of a few meters up to at least 10 km. The fine structure of atmospheric absorption of light in the wavelength range 2.0–2.1 μm produces a variation of this absorption by a factor of 10–30 when the wavelength is varied over a small range such as 0.001 μm. This is illustrated in FIGS. 1 and 2, which cumulatively exhibit atmospheric absorption, for water vapor only and for all atmospheric species present, versus wavelength over a wavelength range 2.010–2.030 μm. Note that the absorption for water vapor only and the absorption for all species appear to reach joint minima for a wavelength of about 2.022 μm. This wavelength is thus especially attractive for transmission through the atmosphere, with or without water vapor present.

In a preferred embodiment, the invention produces selectable laser output radiation with wavelength in the range 2.010–2.030 μm, working with thulium-doped material that has both lutetium and yttrium present at sites usually occupied by yttrium in Tm:YAG, with appropriate fractions of yttrium and/or lutetium included. The laser host material is referred to herein as thulium-doped lutetium/yttrium aluminum garner (written Tm:LuYAG herein), with approximate chemical composition $(Tm_x(Y_wLu_{1-w})_{1-x})_3Al_5O_{12}$, with $x$ lying approximately in the range $0.01 \leq x \leq 0.50$ and $w$ lying in the range $0.01 \leq w \leq 0.99$. The Tm:LuYAG material produces light with selectable wavelengths in the range $\lambda = 2.015$–$2.024$ μm, where the normally absorbing atmosphere has a transmission window with markedly reduced absorption. Yttrium and lutetium, with spectroscopic configurations of $[Kr]3d^14s_2$ and $[Xe]4d^15s^1$, respectively, may be similar enough that substituting Lu atoms for a portion of the Y atoms in YAG does not present a serious lattice distortion problem.

Using these materials, a desired wavelength in a suitable range is selected by varying the ambient temperature from −20° C. temperature to 50° C. and/or by varying the chemical composition parameters $x$ and $w$ in the compound $(Tm_x(Y_wLu_{1-w})_{1-x})_3Al_5O_{12}$. Note that the fractions of Tm and Lu present can be varied independently here.

Figure 3:
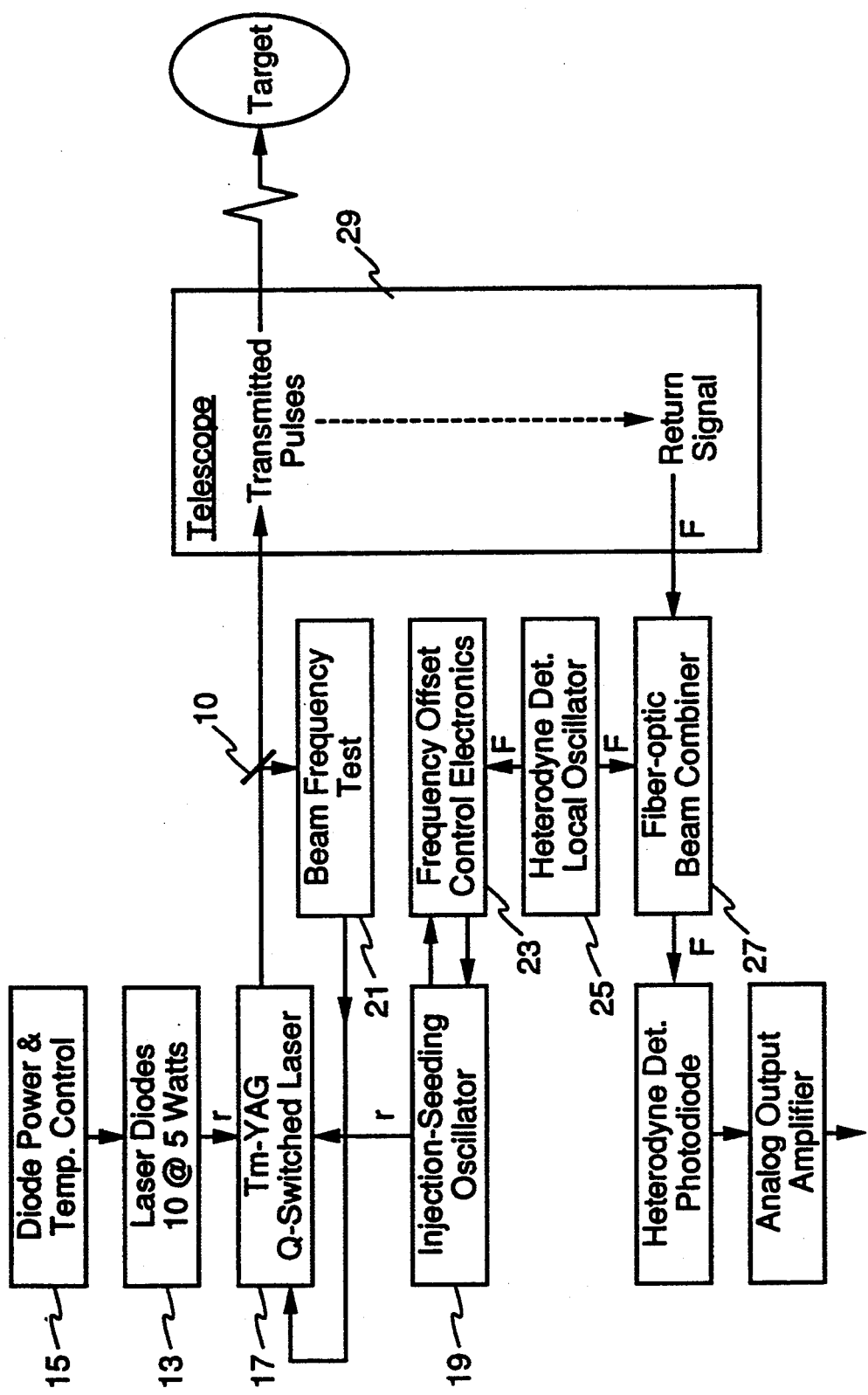
FIG. 3 is a schematic view of apparatus suitable to pump, drive and control a laser constructed according to the invention.

FIG. 3 schematically illustrates a system 11 suitable for producing light with wavelengths in the desired range, using the materials discussed herein. The system 11 includes a plurality of laser diodes 13, each producing 1–10 Watts and controlled by a diode power and temperature control module 15. The laser diode output light is applied to pump a Q-switched laser resonator 17 containing one of the disclosed laser materials "LM". A seed pulse for the laser material LM is provided by an injection seeding oscillator 19 that is, optionally, controlled by a frequency offset and control electronics module 21 and a heterodyne local oscillator module 23, arranged as shown in FIG. 2. Preferably, the oscillator material is the same as the laser material, or at least produces light in a band that substantially overlaps a suitable emission band for injection seeding of the laser material.

A small portion of the output light beam produced by the laser material LM is received by a beam monitoring module 25. The beam monitoring module 215 returns a signal indicating the wavelength mismatch between the out put of the Q-switched laser and the output of the injection seeding oscillator 19. This return signal is used to vary the output wavelength of either the oscillator module 19 or the resonator module 17, in order to maintain the output beams of these two modules at the same wavelength. The output laser beam LB from the resonator module 17 is received by an optical telescope 20 and thereby transported to a selected target, such as a portion of the atmosphere to be interrogated. Light scattered or reflected from the target (not shown) is collected by the same telescope or by a different telescope. Heterodyne detection of this scattered or reflected light produces a signal that can be frequency-analyzed to provide data on the target.

Preferably, the laser diodes and the laser material LM are initially cooled to a temperature T slightly below 25° C. and the laser resonator module 17 is acousto-optically Q-switched. Ideally, the system shown in FIG. 3 will produce a pulse energy of 1–1000 millijoules with a pulse duration of 1 μsec, with a pulse repetition rate of 1–500 Hz and a single frequency output wavelength in the range 2.010–2.030 μm. More generally, the wavelength range 1.80 μm $\leq \lambda \leq$ 2.20 μm is of interest here.

Figure 4:
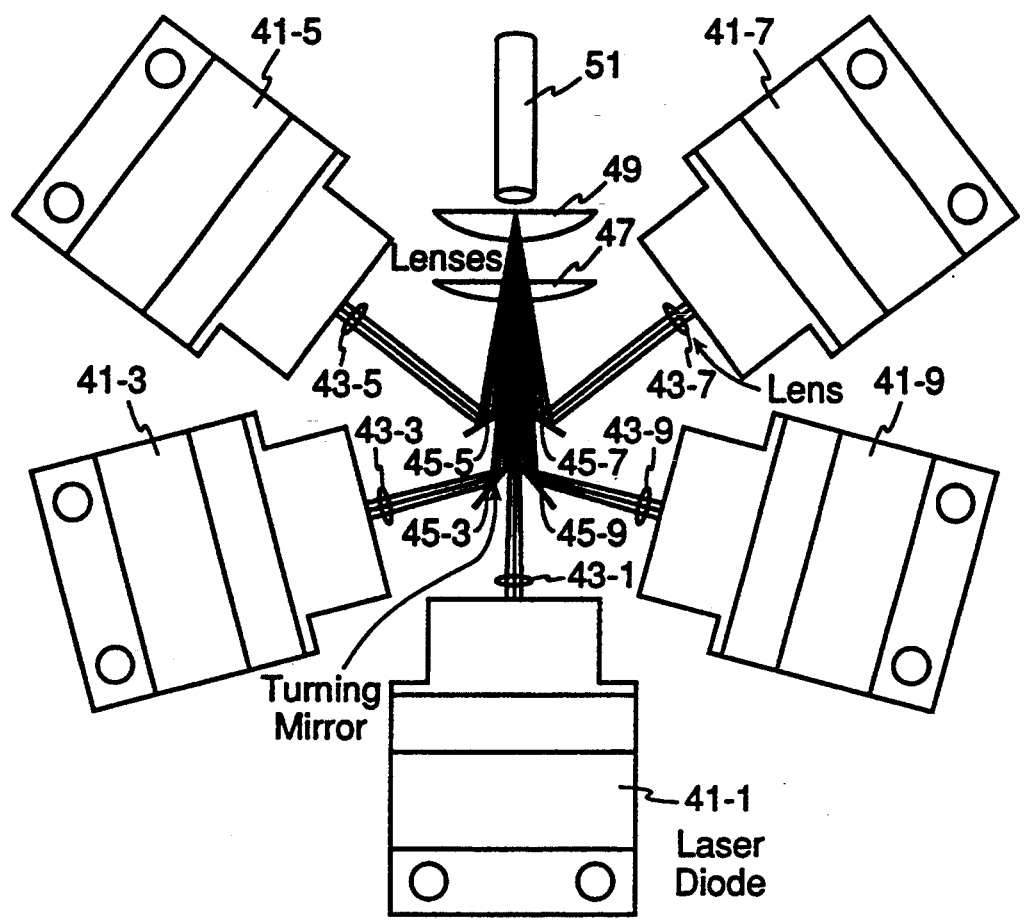
FIG. 4 is a schematic view of apparatus suitable for collecting and delivering laser diode pump light to the laser material used in this invention.

Rare-earth-doped laser materials, such as the materials disclosed here, have relatively large (maximum) effective energy storage times, of the order of $\tau = 1$–$10$ msec, which allows use of pulse switchout times of the order of $f = \frac{1}{2}\tau = 50$–$500$ Hz. FIG. 4 illustrates suitable apparatus for coupling the pump light from individual laser diodes into an optical fiber that delivers this pump light to the laser material used in FIG. 3. The output light from as many as five laser diodes 41-i(i=1, 3, 5, 7, 9) can be coupled into a single optical fiber 51, using turning mirrors 43-i(i=3, 5, 7, 9) and one or more lenses 47 and 49 to redirect and focus the diode light emissions. Two or more such fibers can deliver the pump light to opposite end surfaces of a slab of the selected laser material LM, with the slab being anti-reflection coated on these two surfaces for efficient input coupling of this pump light. Preferably, thulium doping fractions of 1–10 percent are used for the laser material LM.

We have prepared slabs of LuYAG laser materials $(Tm_x(Y_wLu_{1-w})_{1-x})_3Al_5O_{12}$, with x=0.04 and w=0.0, 0.5 and 1.0, and have measured the dominant wavelength of light emitted from each of these three laser materials. The measurements results are presented in Table 1.

TABLE 1

Dominant emission wavelength for certain Tm-doped laser materials

| Laser Material | Dominant Wavelength | Emitted Power | w |
|---|---|---|---|
| Tm:YAG | 2.014 μm | 1.5 Watts | 0.0 |
| Tm:LuYAG | 2.022 | 1.4 | 0.5 |
| Tm:LuAG | 2.020 | 1.4 | 1.0 |

The results for Tm:LuAG are surprising in that the published emission wavelength of 2.024 μm was not observed. However, the dominant wavelength ranges for each of the two ranges of materials $(Tm_x(Y_wLu_{1-w})_{1-x})_3Al_5O_{12}$, for $0 \leq w \leq 0.5$ and $0.5 \leq w \leq 1.0$ (with x=0.04) include the wavelength $\lambda = 2.022$ μm, which is especially attractive for long distance transmission in the atmosphere. We expect that at least two particular parameter pair choices (x,w) in the ranges (x=0.04, $0 \leq w \leq 0.5$) and (x=0.04, $0.5 \leq w \leq 1.0$) will produce dominant wavelengths of approximately 2.022 μm. The particular choice of the parameter value w to produce the wavelength 2.022 μm will vary with the choice of the fraction x of thulium doping.

Figure 5:
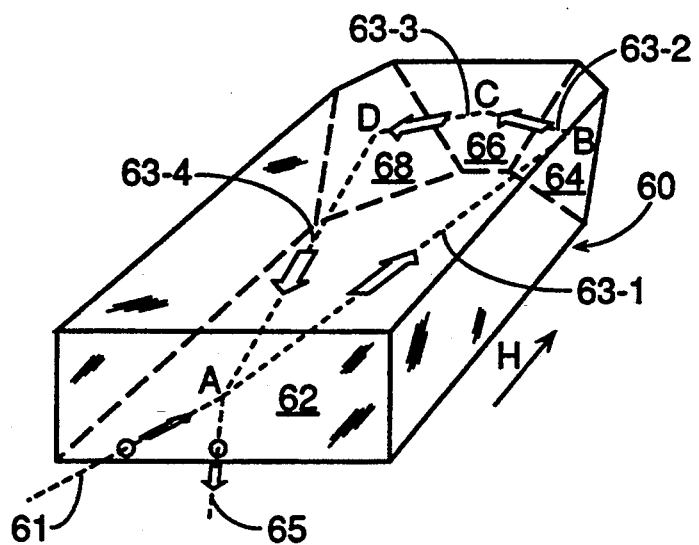
FIG. 5 is a perspective view of a monolithic resonator, constructed according to the invention, that has been successfully tested.

We have measured the light emitted from a slab of the laser material Tm:LuYAG, using a monolithic, unidirectional, single-mode ring laser resonator design 60 illustrated in FIG. 5 and discussed by T. J. Kane and R. L. Byer in "Monolithic, unidirectional single-mode Nd:YAG ring laser", Optics Letters, vol. 10 (1985) pp. 65–67, incorporated by reference herein. This resonator is also discussed by T. S. Kubo and T. J. Kane in "Diode-Pumped Lasers at Five Eye-Safe Wavelengths", I.E.E.E. Jour. Quantum Electronics, vol. 28 (1992) pp. 1033–1040, incorporated by reference herein.

A pump light beam 61 produced by a pump laser (not shown) enters the laser material by refraction at a first surface 62 (preferably anti-reflection coated for the pump wavelength) and follows a first path segment 63-1 until the light beam is reflected at a second surface 64. The reflected light beam then follows a second path segment 63-2, is reflected at a third surface 66, follows a third path segment 63-3, is reflected at a fourth surface 68, and follows a fourth path segment 63-4 until this light beam encounters the first surface 62 a second time. At this point, very little of energy remains in the original pump beam. A second light beam 69 follows the same path as the pump beam 61 within the resonator 60, is amplified by the energy previously deposited by the pump beam, is refracted and passes out of the resonator as an amplified light beam 70, and is directed toward a target (not shown).

Figure 6:
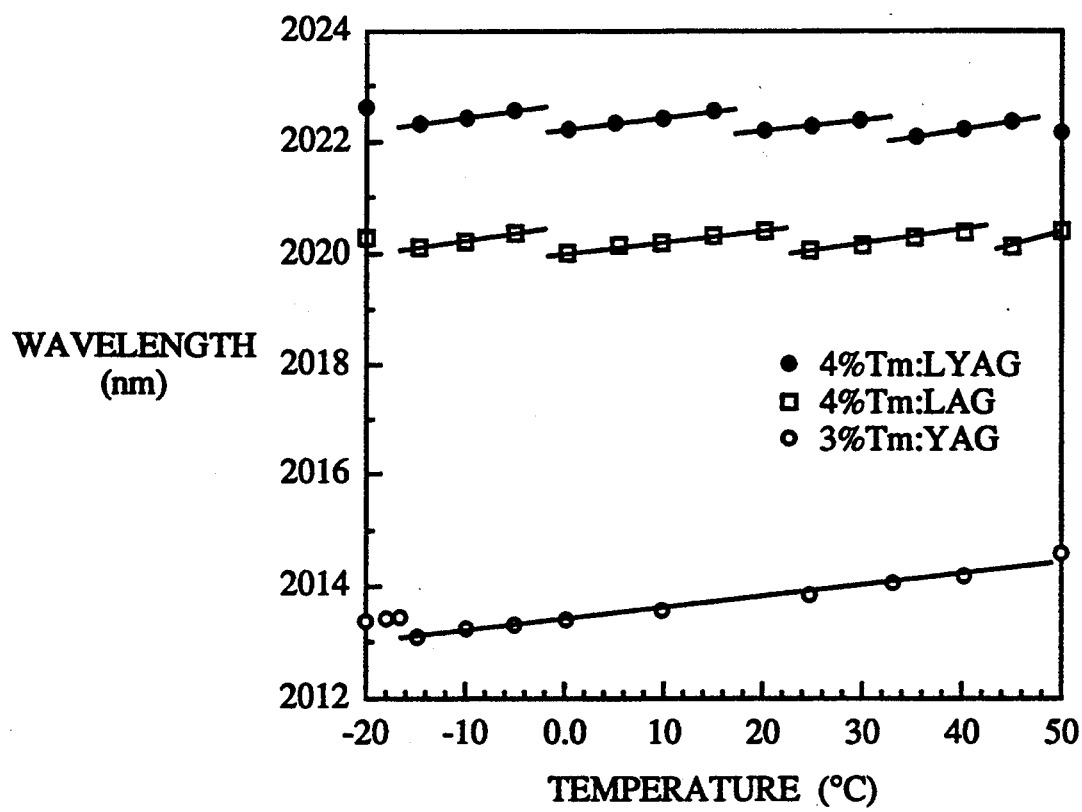
FIGS. 6 and 7 are graphical views illustrating emission wavelength as a function of temperature, for the configuration of FIG. 5, also illustrating the effect of variation of the thulium doping percentage and lutetium percentage for the laser material.

We have tested a laser, including the Tm:LuYAG material and fabricated in the monolithic resonator design and laser shown in FIG. 5, for wavelength selectability as temperature and/or material composition is varied. The results of these tests are presented in FIG. 6, for a temperature range $T = -20°$ C.–$+50°$ C., and for three material compositions: (1) 4% Tm:LuYAG (w=0.5); (2) 4% Tm:LuAG; and (3) 3% Tm:YAG. For the first laser material and the second laser material used here, the emission wavelengths arrange themselves along a sequence of four or more line segments with emission wavelength λ(emission) increasing with increasing temperature over a narrow temperature range, with a corresponding range of λ(emission) of no more than 0.0005 μm. The sawtooth arrangement of λ(emission) for the first and second laser materials is believed to arise from the resonator jumping from one strongest mode to another strongest mode as the temperature, and thus the resonator full cycle path length, increases.

Surprisingly, the third material, 3% Tm:YAG, exhibits a monotonic, non-sawtooth increase in emission wavelength λ(emission) as temperature T is increased from about $-15°$ C. to $+50°$ C., and possibly beyond this highest temperature. This indicates that use of thulium doping of no more than 3 percent and use of less than 50 percent lutetium will provide an emission wavelength λ(emission) that increases monotonically with increasing temperature, at least in an interesting temperature range, such as $-15°$ C.$\leq T \leq +50°$ C., and that a wavelength range of about 0.001 μm (=2.014 μm–2.013 μm) or larger is available within this temperature range from temperature tuning. The maximum Tm doping fraction and the maximum Lu fraction that provide this monotonic behavior may depend upon each other.

Figure 7:
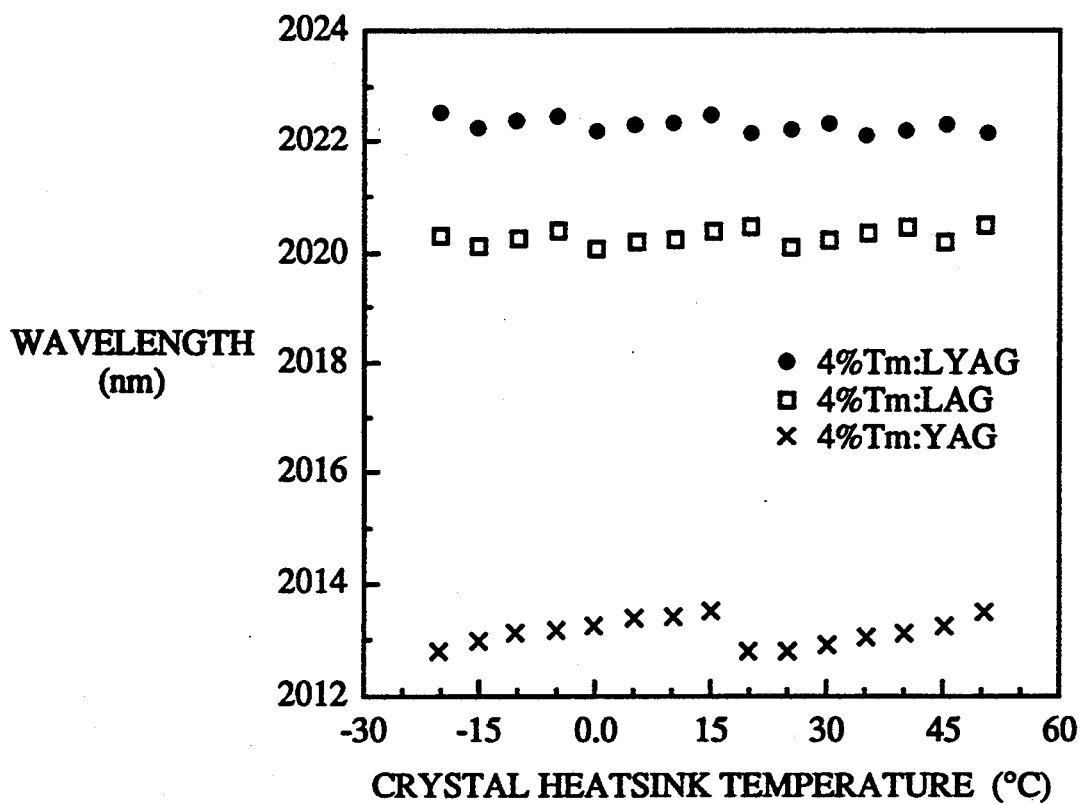

We have tested another set three Tm:LuYAG materials and have obtained slightly different results, presented in FIG. 7. Here, the third material, 4% Tm:YAG exhibits a monotonic increase in emission wavelength λ(emission) for each of two temperature sub-ranges, $-20°$ C.$\leq T \leq 15°$ C. and $20°$ C.$\leq T \leq 50°$ C. Monotone increase of λ(emission) over the entire temperature range is not present here, with a higher Tm doping fraction. However, the monotonic increase over each of these two temperature subranges allows λ(emission) to be tuned over a relatively wide tuning range, 2012.8 nm $\leq$ λ(emission) $\leq$ 2013.5 nm.

Several other materials also produce wavelengths in a broader range of interest, such as $\lambda = 2.000-2.040$ μm. For example, $Y_3Al_5O_{12}$(YAG), $(Y,Er)_3Al_5O_{12}$, $Y_3Al_5O_{12}Cr^{3+}$, and $(Yb,Er)_3Al_5O_{12}$, each doped with $Tm^{3+}$, produce light with the respective wavelengths 2.0132 μm, 2.014 μm, 2.019 μm and 2.0195 μm, as noted by A. V. Kaminskii in *Laser Crystals*, Springer Verlag, New York, 1981, p. 394. Here, erbium or ytterbium may act as an optical sensitizer, in a manner analogous to the better known optical sensitizer $Cr^{3+}$. The amount of $Cr^{3+}$ needed for optical sensitization is usually quite small (0.1–3 percent), although higher concentrations of $Cr^{3+}$ can be used. The required amount of Er or Yb used as an optical sensitizer is usually higher, ranging from 1 percent up to as high as 20 percent.

A more general formulation of a suitable aluminum garnet laser material that produces light with a wavelength in the range 2.0 μm$\leq \lambda \leq$2.2 μm is: a solid-state body of thulium-doped aluminum garnet containing selected fractions of lutetium and yttrium, plus an optical sensitizer (denoted "Sen" here), which may be erbium, ytterbium and/or chromium, and having the approximate chemical composition

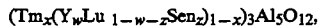

$(Tm_x(Y_wLu_{1-w-z}Sen_z)_{1-x})_3Al_5O_{12}$, with x, w and z lying approximately in the ranges $0.01 \leq x \leq 0.5$, $0.01 \leq w \leq 0.99$ and $0.001 \leq z \leq 0.2$, respectively.

Other suitable solid-state laser host materials that use Y as a major constituent include yttrium lithium fluoride ("YLF") and yttrium scandium aluminum garnet, both of which can be thulium-doped. A fraction w of the Y atoms can be replaced by Lu atoms to produce $Tm_x(Y_wLu_{1-w})_{1-x}LiF_4$ and $(Tm_x(Y_wLu_{1-w})_{1-x})_3Sc_2Al_3O_{12}$. The laser emission wavelength can be tuned over a modest range, by varying the fractions x and w or by changing the temperature of the laser material.

By analogy, a general formulation of a suitable laser material using lithium fluoride as a constituent that produces light having a wavelength in another interesting wavelength range, such as 1.9 μm$\leq \lambda \leq$2.0 μm, would be: a solid-state body of thulium-doped lithium fluoride containing selected fractions of lutetium and yttrium, plus an optical sensitizer Sen (Er, Yb and/or Cr), and having the approximate chemical composition

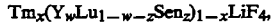

$Tm_x(Y_wLu_{1-w-z}Sen_z)_{1-x}LiF_4$, with x lying approximately in the range $0.01 \leq x \leq 0.50$, w lying in the range $0.01 \leq w \leq 0.99$ and z lying in the range $0.001 \leq z \leq 0.2$.

By analogy, a general formulation of a suitable laser material using scandium aluminum garnet as a constituent that produces light with a wavelength in the range 2.020 μm$\leq \lambda \leq$2.030 μm would be: a solid-state body of thulium-doped scandium aluminum garnet containing selected fractions of lutetium and yttrium, plus an optical sensitizer Sen (Er, Yb and/or Cr), and having the approximate chemical composition $$(Tm_x(Y_wLu_{1-w-z}Sen_z)_{1-x})_3Sc_2Al_3O_{12},$$

with x lying approximately in the range $0.01 \leq x \leq 0.5$, w lying in the range $0.01 \leq w \leq 0.99$ and z lying in the range $0.001 \leq z \leq 0.2$.

Other materials with emission wavelengths in the same range include $CaF_2$-$ErF_3$ and $CaF_2$-$YF_3$, each doped with $Ho^{3+}$, which materials produce wavelengths of 2.030 μm and 2.0318 μm, respectively, as noted by A. V. Kaminskii, ibid. Of course, it is not clear, from the mere recitation of an observed wavelength, whether a laser made of the corresponding material can produce a single wavelength emission, or an emission line of sufficient strength, to serve as a suitable laser for propagation through the atmosphere.

The laser materials discussed here allow tuning of the emission wavelength of the laser light by variation of the temperature or of the chemical composition. Although this discussion has focused on production of a light beam with small atmospheric absorption, in some instances production of a light beam with relatively high atmospheric absorption is desired. With reference to FIGS. 1 and 2, the temperature and/or chemical composition can be varied to produce a light beam with a local maximum, referenced to wavelength variation, in absorption for propagation in a given gas medium.

We claim:

1. A laser material for a solid-state laser that, when pumped, emits electromagnetic radiation with a wavelength in the range $\lambda = 1.9$–$2.1$ μm, the material comprising:
   a solid-state body of thulium-doped lithium fluoride containing selected fractions of lutetium and yttrium and having the approximate chemical composition $$Tm_x(Y_wLu_{1-w})_{1-x}LiF_4,$$

with x lying approximately in the range $0.01 \leq x \leq 0.50$ and w lying in the range $0.01 \leq w \leq 0.99$.

2. The material of claim 1, wherein said thulium-doped aluminum garnet material further includes an optical sensitizer, denoted Sen and drawn from the group consisting of Er, Yb and Cr, and said approximate chemical composition $$Tm_x(Y_wLu_{1-w-z}Sen_z)_{1-x}LiF_4,$$

and z is a parameter lying in the range $0.001 \leq z \leq 0.2$.

3. The material of claim 1, wherein said wavelength λ of said radiation lies in the range 2.020 μm $\leq \lambda \leq$ 2.030 μm.

4. A laser material for a solid-state laser that, when pumped, emits electromagnetic radiation with a wavelength in the range $\lambda = 2.0$–$2.2$ μm, the material comprising:
   a solid-state body of thulium-doped scandium aluminum garnet containing selected fractions of lutetium and yttrium and having the approximate chemical composition $$(Tm_x(Y_wLu_{1-w})_{1-x})_3Sc_2Al_3O_{12},$$

with x lying approximately in the range $0.01 \leq x \leq 0.5$ and w lying in the range $0.01 \leq w \leq 0.99$.

5. The material of claim 4, wherein said thulium-doped aluminum garnet material further includes an optical sensitizer, denoted Sen and drawn from the group consisting of Er, Yb and Cr, and said approximate chemical composition becomes $$(Tm_x(Y_wLu_{1-w-z}Sen_z)_{1-x})_3Sc_2Al_3O_{12},$$

and z is a parameter lying in the range $0.001 \leq z \leq 0.2$.

6. The material of claim 4, wherein said wavelength λ of said radiation lies in the range 2.020 μm $\leq \lambda \leq$ 2.030 μm.

7. A method for providing a laser material for a solid-state laser that, when pumped, emits electromagnetic radiation with an emission wavelength in the emission range $\lambda = 2.0$–$2.2$ μm and that allows selection of the emission wavelength over a range of at least 0.0005 μm within the emission range, the method comprising the steps of:
   providing a solid-state body of thulium-doped aluminum garnet containing selected fractions of lutetium and yttrium and having the approximate chemical composition $$(Tm_x(Y_wLu_{1-w})_{1-x})_3Al_5O_{12},$$

with x lying approximately in the range $0.01 \leq x \leq 0.5$ and w lying in the range $0.01 \leq w \leq 0.99$;
   selecting a value x that is no greater than 0.04;
   selecting a value w that is no greater than 0.5; and
   varying the temperature T of the laser material over a range that is included within the temperature range $-50°$ C. $\leq T \leq +15°$ C.

8. The method of claim 7, further comprising the steps of:
   selecting said value x to be no greater than 0.03; and
   varying said temperature T over at least a portion of said temperature range $-50°$ C. $\leq T \leq +15°$ C. to obtain a variation of emission wavelength of at least 0.001 μm.

9. The method of claim 7, further comprising the step of including in said thulium-doped aluminum garnet material an optical sensitizer, denoted Sen and drawn from the group consisting of Er, Yb and Cr, so that said approximate chemical composition becomes $$(Tm_x(Y_wLu_{1-w-z}Sen_z)_{1-x})_3Al_5O_{12},$$

and z is a parameter lying in the range $0.001 \leq z \leq 0.2$.

10. A laser material for a solid-state laser that, when pumped, emits electromagnetic radiation with a wavelength in the range $\lambda = 2.0$–$2.2$ μm, the material comprising:
    a solid-state body of thulium-doped aluminum garnet containing selected fractions of lutetium and yttrium and having the approximate chemical composition $$(Tm_x(Y_wLu_{1-w-z}Sen_z)_{1-x})_3Al_5O_{12},$$

where Sen is an optical sensitizer drawn from the group consisting of Er, Yb and Cr, with x lying approximately in the range $0.01 \leq x \leq 0.5$, w lying in the range $0.01 \leq w \leq 0.99$, and z lying in the range $0.001 \leq z \leq 0.2$.

11. A method for transmission of light through a path of arbitrary length in the Earth's atmosphere, the method comprising the steps of:

providing a solid-state body of thulium-doped aluminum garnet containing selected fractions of lutetium and yttrium and having the approximate chemical composition $(Tm_x(Y_wLu_{1-w-z}Sen_z)_{1-x})_3Al_5O_{12}$, where Sen is an optical sensitizer drawn from the group consisting of Er, Yb and Cr, with x lying approximately in the range $0.01 \leq x \leq 0.5$, w lying in the range $0.01 \leq w \leq 0.99$, and z lying in the range $0.001 \leq z \leq 0.2$;

exciting the laser so that the laser emits light having a selected wavelength in the range $2.010 \mu m \leq \leq 2.030 \mu m$; and directing the light emitted by the laser along a selected path in the atmosphere.

* * * * *